No. 780,887. PATENTED JAN. 24, 1905.
A. J. JACOBS.
VEHICLE BRAKE.
APPLICATION FILED JULY 11, 1904.

4 SHEETS—SHEET 1.

WITNESSES:
W. M. Avery
A. H. Davis

INVENTOR
Aaron Jonah Jacobs
BY
Munn
ATTORNEYS.

No. 780,887. PATENTED JAN. 24, 1905.
A. J. JACOBS.
VEHICLE BRAKE.
APPLICATION FILED JULY 11, 1904.

4 SHEETS—SHEET 3.

WITNESSES:
W. M. Averl
A. H. Davis

INVENTOR
Aaron Jonah Jacobs
BY
Munn
ATTORNEYS.

No. 780,887. PATENTED JAN. 24, 1905.
A. J. JACOBS.
VEHICLE BRAKE.
APPLICATION FILED JULY 11, 1904.

4 SHEETS—SHEET 4.

WITNESSES:
W. M. Avery
A. H. Davis

INVENTOR
Aaron Jonah Jacobs
BY
ATTORNEYS.

No. 780,887.

Patented January 24, 1905.

UNITED STATES PATENT OFFICE.

AARON JONAH JACOBS, OF BRISTOL, ENGLAND.

VEHICLE-BRAKE.

SPECIFICATION forming part of Letters Patent No. 780,887, dated January 24, 1905.

Application filed July 11, 1904. Serial No. 216,047.

*To all whom it may concern:*

Be it known that I, AARON JONAH JACOBS, boot-factor, a subject of the King of Great Britain, residing at 33 Salisbury road, Redland, Bristol, in the county of Gloucester, England, have invented certain new and useful Improvements in Braking Arrangements for Perambulators, Mail-Carts, and Like Vehicles Propelled by Hand, of which the following is a specification.

My invention has for its object to provide perambulators, mail-carts, and other three or four wheeled vehicles propelled by hand with means whereby on the release of the handle-bar or shafts a brake will be automatically applied to the wheels, the construction being such that the brake will be automatically held off whether the vehicle is propelled by means of the handles either in the forward or backward direction or is tilted backward, as in mounting a step or curb in the forward direction, or is tilted forward, as in mounting a step or curb in the rearward direction.

I am aware that it has before been proposed to provide perambulators and similar vehicles with brakes operated by means of pivoted handles with the object of preventing accidents, such as are liable to be caused by the vehicle running away in consequence of having been left unattended on an incline, &c.; but such brake-gears are usually too complicated in construction for general use and come into action not only when required, but also either when the handle is depressed or lifted for the purpose of causing the vehicle to mount a step while moving in the forward direction or else when the handle is lifted or raised for the purpose of causing the vehicle to mount a step when moving in the backward direction.

It is the object of the present invention to remedy the defects referred to.

My invention is illustrated in the accompanying drawings as applied to a mail-cart; but it is to be understood that it may be applied with equal advantage to perambulators or other children's carriages furnished with not less than three traveling wheels.

Figure 1:
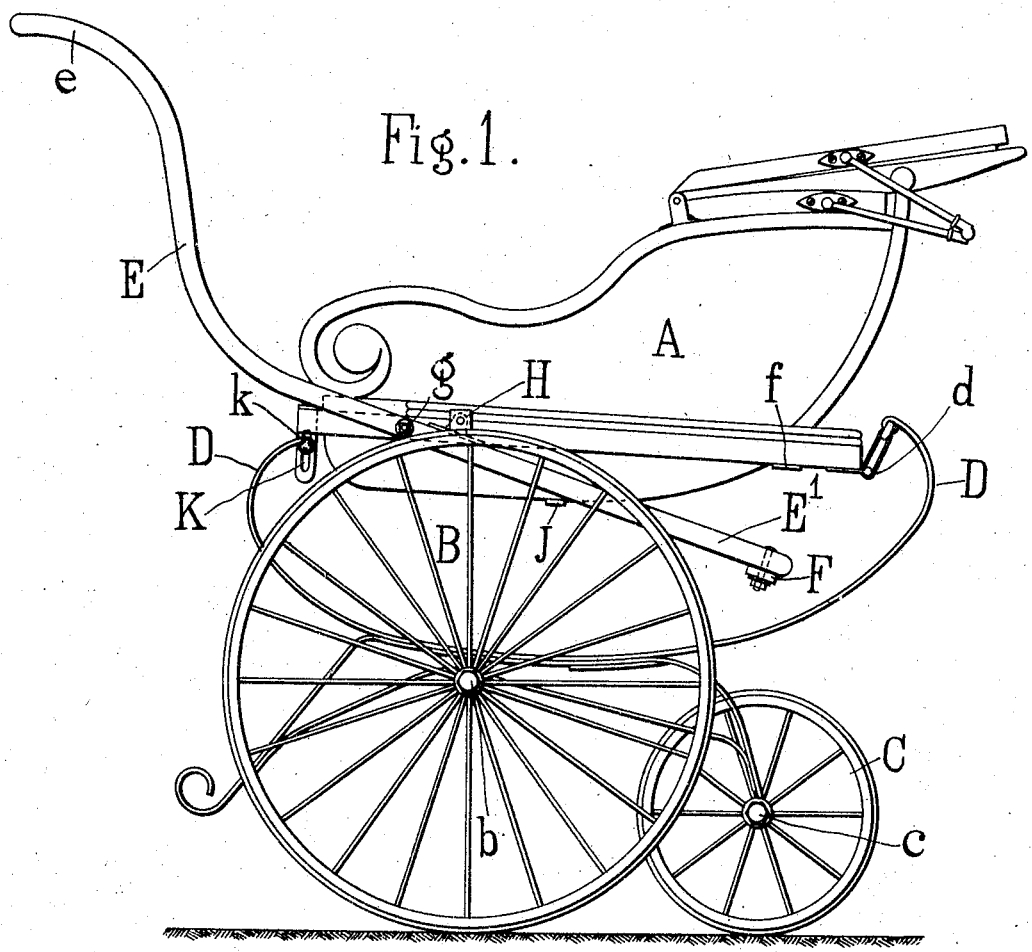
Figure 2:
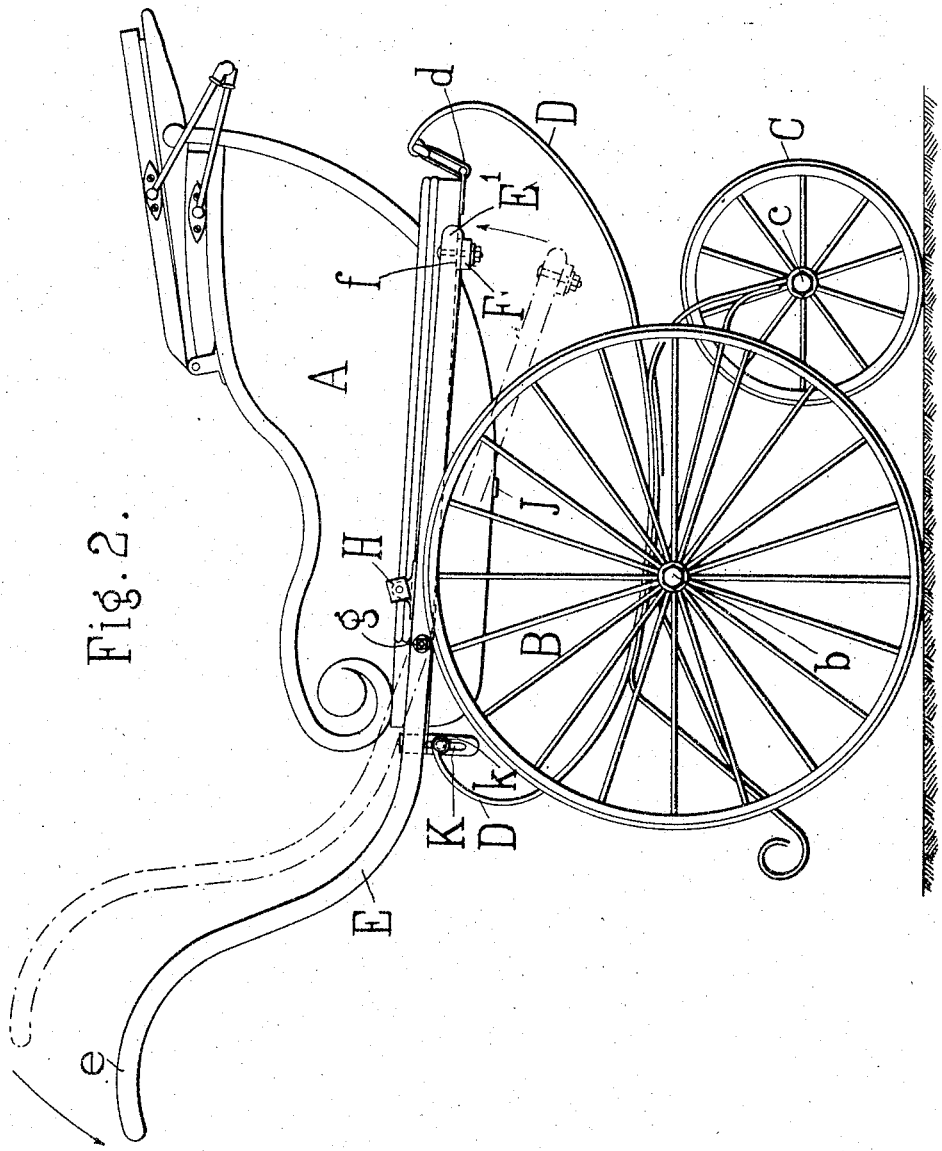
Figure 3:
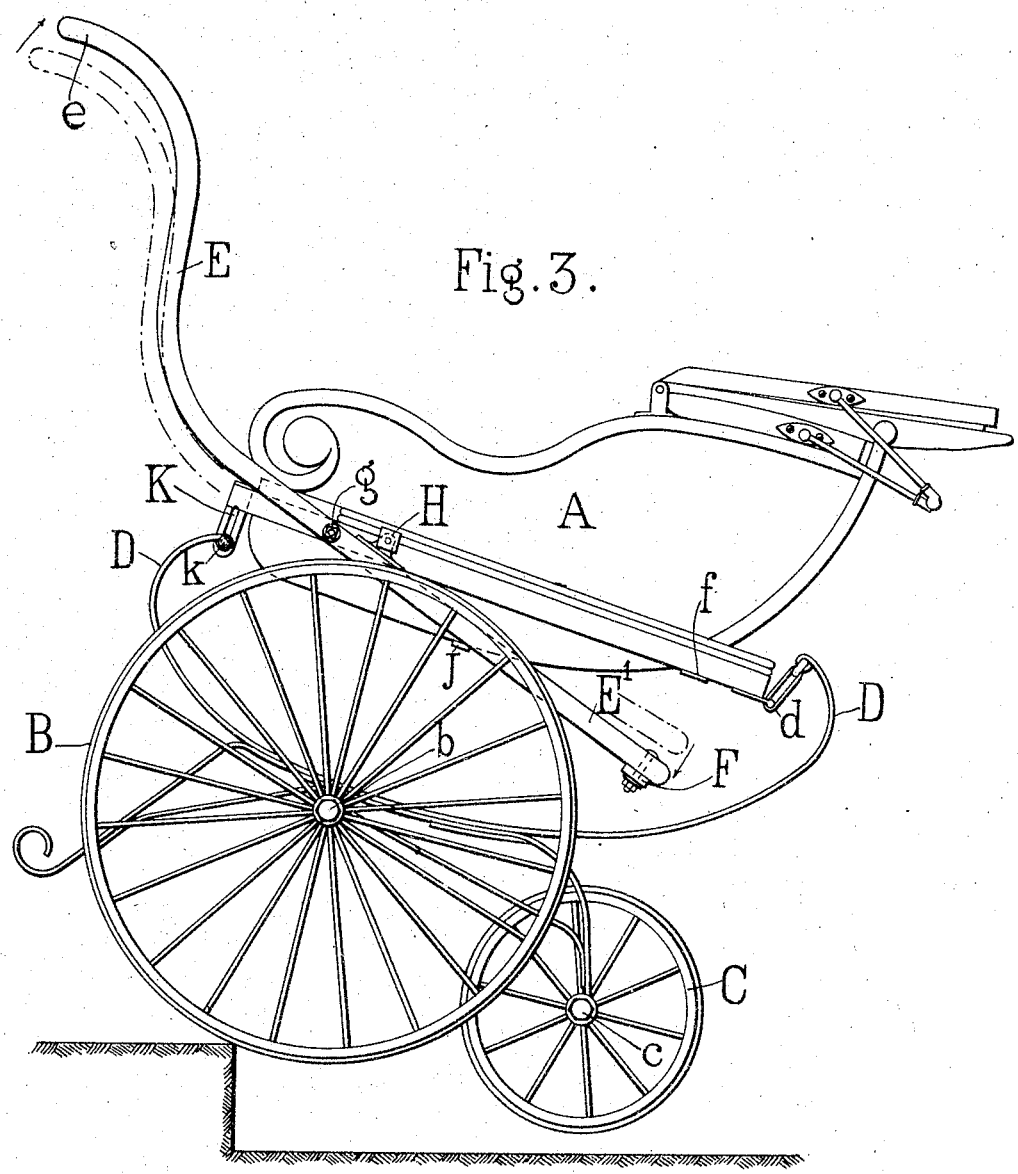
Figure 4:
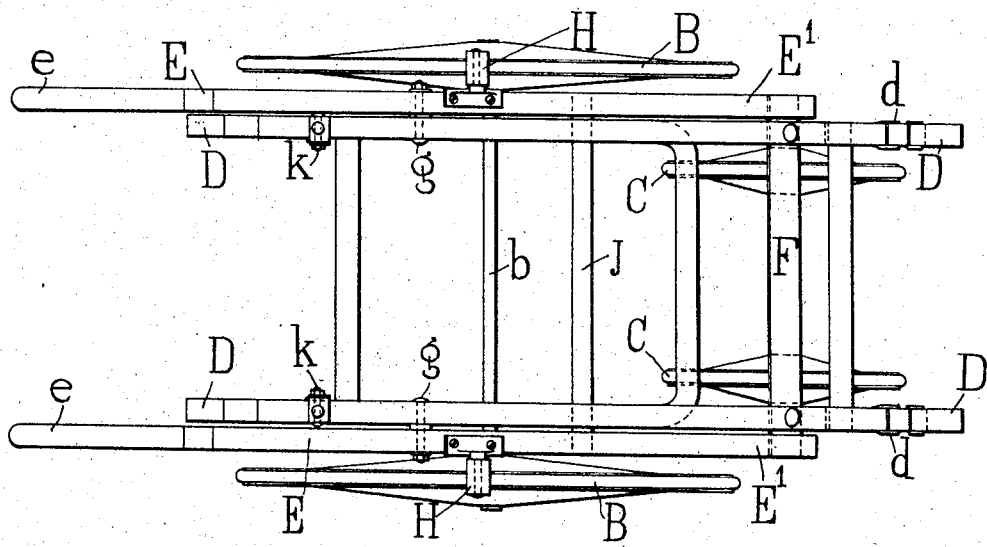

In the drawings, Figure 1 is a side elevation of a four-wheeled mail-cart as it would appear when left standing on the level, the brakes being then automatically applied. Fig. 2 is a similar view showing the position of the parts when the vehicle is being propelled either forward or backward. Fig. 3 is a similar view showing the position of the parts when the vehicle is being caused to mount a step in the rearward direction. Fig. 4 is a plan of the frame, the body of the vehicle being omitted.

In the example shown, A is the body of the vehicle. B and C are the main or rear and the front wheels, respectively, and D the underframe or springs, by means of which the body is supported upon the axles $b$ and $c$.

E represents the shafts or handles, which are pivoted to the body A of the vehicle, as at $g$, and are continued forward beyond the fulcrum $g$ by means of extensions E′, which are preferably connected at their front ends by a cross-bar F. The brake-blocks H are attached to the respective shaft extensions E′, so as to project outwardly therefrom over the wheel-tires each at a point near the fulcrum $g$.

Normally—that is, when shafts E are released—the brake-blocks H rest upon the wheel-tires, as indicated in Fig. 1, this being brought about preferably by the cross-bar F being made of sufficient weight to draw down the shaft extensions E′ and effectively apply the brakes. The handle ends $e$ of the shafts E when released should stand at a level somewhat higher than is generally convenient for grasping the handles in order to propel the vehicle. Hence on a person grasping the shafts in order to propel the vehicle in either direction the handle ends $e$ of the shafts are as a matter of course depressed from the position indicated in dotted lines in Fig. 2 to that indicated in full lines, and the brake-blocks are consequently raised out of contact with the wheels, as shown.

For the purpose of enabling the vehicle to be tilted backward (that is, in the direction of the handles) about its main or rear axle $b$, so as to cause the front wheels C to mount a step as the vehicle is wheeled in the forward direction and without the brakes being applied, the movement of the shafts E relatively to the body A of the vehicle in the direction to release the brake is limited by encountering the body of the vehicle, which is preferably provided with a pair of india-rubber or spring buffers $f$ in position to be encountered by the shaft extensions E' or by the cross-bar F, when the shaft extensions are raised by the depression of the handle ends $e$, as shown in Fig. 2, any further movement of the shafts in the same direction having for effect to cause the shafts E, body A, springs D, and front wheels C to turn as one about the axle $b$ as a center, so that the front wheels C are lifted off the ground, the brakes being meanwhile held off. Upon the step to be mounted being encountered by the rear or main wheels B the shafts E are raised so as to lift the said wheels over the step, the brakes being meanwhile still held off, as will now be described, so as to permit of the mounting of the step being assisted by the wheels B being free to roll upward over the edge of the step.

For the purpose of enabling the vehicle to be tilted forward about the front axle $c$ by an upward movement of the handle ends $e$ of the shafts (whether for the purpose just mentioned or in order to cause the main wheels B to mount a step as the vehicle is moved in the rearward direction, as indicated in Fig. 3, without the brakes being applied) the upward movement of the shafts (and consequent downward movement of the shaft extension E') relatively to the body A is limited. This is preferably effected by means of stops J, attached to and projecting laterally from the body A in position to be encountered by the shaft extensions E' when the handle ends $e$ of the shafts E are lifted, as indicated in Fig. 3, above the normal position wherein the brakes are applied, as shown in Fig. 1, so that when the handles are thus raised they and the body A will first turn as one about the flexible connection $d$ of the body with the forward end of the springs or underframe D, such movement of the body relatively to the springs or underframe being permitted by a pin-and-slot connection between the body and the rear end of the springs or underframe. This connection consists of a plate secured to the rear end of the body at each side and provided with a slot K, extending tangentially of the center $d$, and a cross-pin $k$ on the end of each spring D and engaging in the corresponding slot K, the length of the slots being such as to permit of the shafts or handles and body of the vehicle being raised by an angular movement about the point $d$ so far as to enable the brake-blocks H to clear the wheels. When the shaft E and body A have been thus far raised, the pins $k$ will be encountered by the lower ends of the slots K, and the continued upward movement of the shafts E and body A will have for effect, as indicated in Fig. 3, to lift also the springs D and main wheels B as one by an angular movement about the front axle $c$ as a center, the brakes being meanwhile held off so as to permit a step to be mounted with ease while the vehicle is moved backward upon its front wheels C.

It will be seen that the mechanism consists substantially of two elements—viz., first, pivoted shafts with extensions counterweighted and carrying suitable brake-blocks and stops, and, second, stops on the body or underframe operating with the slots or their equivalents in the connections of the body with the underframe in the manner described.

Although I have described the handles or shafts as being counterweighted so as to tend to cause the brakes to be applied, it is obvious that the same result might be produced by means of a spring. Further, in lieu of the pin-and-slot connection between the body of the vehicle and the underframe or springs, as shown, I may employ other forms of loose connection permitting of limited independent movement of the body relatively to the underframe—such, for example, as a strap or link connection similar to that shown in the drawings at $d$ or a flexible connection between the body and the underframe, or the springs themselves may be sufficiently flexible for the purpose.

I claim—

1. A perambulator comprising a body, a handle attached thereto and adapted to rock thereon, wheels supporting said body, brake-blocks carried by said handle, adjacent to certain of said wheels, means for supporting said body upon said wheels, said means permitting the elevation of the end of said body with respect to the wheels, and means for limiting the movement of said handle on said body.

2. A perambulator comprising wheels, a frame mounted thereupon, a body, a handle pivoted to said body and projecting beyond an end thereof, means for freely supporting said body on said frame permitting said end to be elevated with respect to said wheels, brake-blocks carried by said handle adjacent to said wheels, and means for limiting the movement of said handle upon said body.

3. A perambulator comprising wheels, a frame supported upon said wheels, a body carried on said frame and adapted to tilt upon the same, a handle pivoted to said body, stops on said body limiting the movement of said handle, and brake-blocks carried by said handle which may engage certain of said wheels.

4. A perambulator comprising wheels, a frame supported upon said wheels, a body supported in said frame, a handle pivoted to said body and projecting from one end thereof, means for guiding said body substantially vertically upon said frame adjacent to said end, stops limiting the movement of said handle, and blocks carried by said handle and normally supporting said handle on the rims of certain of said wheels.

5. A perambulator comprising wheels, a body supported thereupon, a handle pivoted to said body and having extensions beyond the pivot-point thereof adapted to overbalance the weight of the body of said handle, brake-blocks carried by said handle and normally resting on certain of said wheels, and means for limiting the movement of said handle on said body.

AARON JONAH JACOBS.

Witnesses:
  LORIN A. LATHROP,
  GEO. E. COLES.